United States Patent
Erickson et al.

(10) Patent No.: US 10,963,956 B1
(45) Date of Patent: Mar. 30, 2021

(54) SEMANTIC COMPUTER LANGUAGE FOR EXCHANGING PLATFORM-AGNOSTIC FINANCIAL INFORMATION

(71) Applicant: UIPCO, LLC, San Antonio, TX (US)

(72) Inventors: Karl Harris Erickson, San Antonio, TX (US); Ann C. Tarrillion, San Antonio, TX (US); Jennifer Gravely, San Antonio, TX (US); Christopher Martin Martinez, San Antonio, TX (US); Jared B. Cook, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 473 days.

(21) Appl. No.: 15/446,610

(22) Filed: Mar. 1, 2017

Related U.S. Application Data

(60) Provisional application No. 62/303,869, filed on Mar. 4, 2016.

(51) Int. Cl.
*G06Q 40/02* (2012.01)

(52) U.S. Cl.
CPC .................... *G06Q 40/02* (2013.01)

(58) Field of Classification Search
CPC ....................................................... G06Q 40/02
USPC ........................................... 705/39; 704/4, 9
See application file for complete search history.

(56) References Cited

U.S. PATENT DOCUMENTS

| | | | | |
|---|---|---|---|---|
| 10,242,407 | B1* | 3/2019 | Hunt | G06Q 40/06 |
| 2007/0185702 | A1* | 8/2007 | Harney | G06F 40/242 |
| | | | | 704/4 |
| 2009/0201294 | A1* | 8/2009 | Hayes | G06Q 40/00 |
| | | | | 345/440 |
| 2010/0030724 | A1* | 2/2010 | Au | G06F 17/27 |
| | | | | 706/55 |
| 2014/0039878 | A1* | 2/2014 | Wasson | G06F 17/28 |
| | | | | 704/9 |
| 2015/0309990 | A1* | 10/2015 | Allen | G06F 16/245 |
| | | | | 704/9 |
| 2016/0358152 | A1* | 12/2016 | Boukadakis | G06F 16/27 |
| 2017/0277667 | A1* | 9/2017 | Weston | G06F 3/0484 |

* cited by examiner

*Primary Examiner* — Samica L Norman
*Assistant Examiner* — Murali K Dega
(74) *Attorney, Agent, or Firm* — Perkins Coie LLP

(57) ABSTRACT

Methods and systems described in this disclosure are directed to providing a plurality of grammatical components of a computer language for representing financial events of a user, receiving first financial information pertaining to the user from a first computing device, the first financial information defined using a first grammatical component in the plurality of grammatical components of the computer language; receiving second financial information pertaining to the user from a second computing device, the second financial information defined using a second grammatical component in the plurality of grammatical components of the computer language; and extracting the first financial information from the first grammatical component and the second financial information from the second grammatical component by parsing the first grammatical component and the second grammatical component.

20 Claims, 7 Drawing Sheets

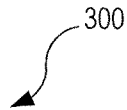

| | |
|---|---|
| Subjects: | Person's Name, Company, Group of People, Financial Advisor(s), Entity 1, IRS, ... |
| Verbs: | Understand, Study, Read, Schedule; Ask, Talk, Follow-Up, Calculate, Compare, Determine, Add, Divide, Subtract; Save, Withdraw, Invest, Allocate, Spend, Transfer, Own, Open, Close, Purchase, Trade, Convert, Approve, Reply, Verify, Download, Print, |
| Quantifiers: | Integers, Decimals, Percentages, Fractions, ... |
| Units: | Dollars, Percentage, Steps, Shares, Occurrences, People, APR, APY, Days, Weeks, Months, Years, Age, |
| Objects: | Types of Accounts (Savings, Checking, Brokerage, etc.); Meetings, Investment Vehicles, Articles, Reference Material, Digital Calculators, Digital Tools, Notes, Tax Forms, Deadlines, Objectives, Milestones, Anniversaries, Apps, Events, Transactions, |
| Measures: | Balance, Interest, Amount Due, Amount Earned, Credit, Difference between two quantities, Change in Value, Dividends, Tax Returns, Penalties, Risk, |
| Timeframes: | Hours, Days, Weeks, Months, Years, Fractions of each, Dates, . |
| Intervals: | Hourly, Daily, Weekly, Monthly, Yearly, Multiples of each, Fractions of each, . |
| Qualifiers: | Conservative, Neutral, Aggressive, |
| Relationships: | Quantity per Unit, Contains, Contained Within, Owns, Shared, Owned By, Divided Among, Between, Evenly, Greater Than, Less Than, ... |

FIG. 3

```xml
<action>
    <for>     Jill M. Saver      </for>
    <from>    Jane L. Advisor    </from>
    <save>
        <title>         $1,000 for Emergency Fund      </title>
        <unit>          $                              </unit>
        <amount>        50                             </amount>
        <frequency>     Monthly                        </frequency>
        <until>
            <specific-account>    ************7192    </specific-account>
            <measure>    Balance                       </measure>
            <value>      At Least                      </value>
            <unit>       $                             </unit>
            <amount>     1000                          </amount>
        </until>
        <account-to>
            <account-type>    Savings                  </account-type>
            <specific-account>    ************7192    </specific-account>
        </account-to>
        <progress>
            <unit>       %                             </unit>
            <quantity>   10                            </quantity>
        </progress>
        <progress>
            <unit>       $                             </unit>
            <quantity>   100                           </quantity>
        </progress>
    </save>
```

FIG. 4

```xml
<history>
    <action>
        <performed-by>   Jill M. Saver   </performed-by>
        <saved>
            <unit>      $              </unit>
            <amount>    50             </amount>
            <date>      09/01/2015     </date>
            <time>      11:11 PM CST   </time>
        </saved>
        <account-to>
            <specific-account>   ************7192   </specific-account>
            <balance>
                <unit>      $        </unit>
                <amount>    100      </amount>
            </balance>
        <account-to>
    </action>
    <action>
        <performed-by>   Jill M. Saver   </performed-by>
        <saved>
            <unit>      $              </unit>
            <amount>    50             </amount>
            <date>      08/01/2015     </date>
            <time>      3:33 PM CST    </time>
        </saved>
        <account-to>
            <specific-account>   ************7192   </specific-account>
            <balance>
                <unit>      $        </unit>
                <amount>    50       </amount>
            </balance>
        </account-to>
    </action>
</history>
</action>
```

SEMANTIC COMPUTER LANGUAGE FOR EXCHANGING PLATFORM-AGNOSTIC FINANCIAL INFORMATION

CROSS-REFERENCE TO RELATED APPLICATIONS

This application is a non-provisional of and claims priority to U.S. Provisional Application No. 62/303,869, filed on Mar. 4, 2016, entitled "SEMANTIC COMPUTER LANGUAGE FOR EXCHANGING PLATFORM-AGNOSTIC FINANCIAL INFORMATION," which is hereby incorporated by reference in its entirety for all purposes.

TECHNICAL FIELD

Various embodiments of the present disclosure generally relate to a standardized computer language for financial transactions. More specifically, various embodiments of the present disclosure relate to methods and systems for design of a feature-rich computer language that is agnostic to platform and device for management, storage, manipulation, and exchange of financial data.

BACKGROUND

Effective management and manipulation of data, including financial data, is important for users and corporations. Because people face an overwhelming set of companies, products, partners, and timelines to carry out financial actions, people often fail to take necessary actions in connection with their financial data.

BRIEF DESCRIPTION OF THE DRAWINGS

Embodiments of the present disclosure will be described and explained through the use of the accompanying drawings in which:

FIG. 3 illustrates a table with various semantic grammar components of a standardized computer language for financial transactions that may be used in accordance with various embodiments of the present disclosure;

FIG. 4 is an example of a financial event as stored and represented using components of a standardized computer language for financial transactions in accordance with various embodiments of the present disclosure;

FIG. 5 is an example of a financial event as stored and represented using components of a standardized computer language for financial transactions in accordance with various embodiments of the present disclosure;

DETAILED DESCRIPTION

Figure 1:
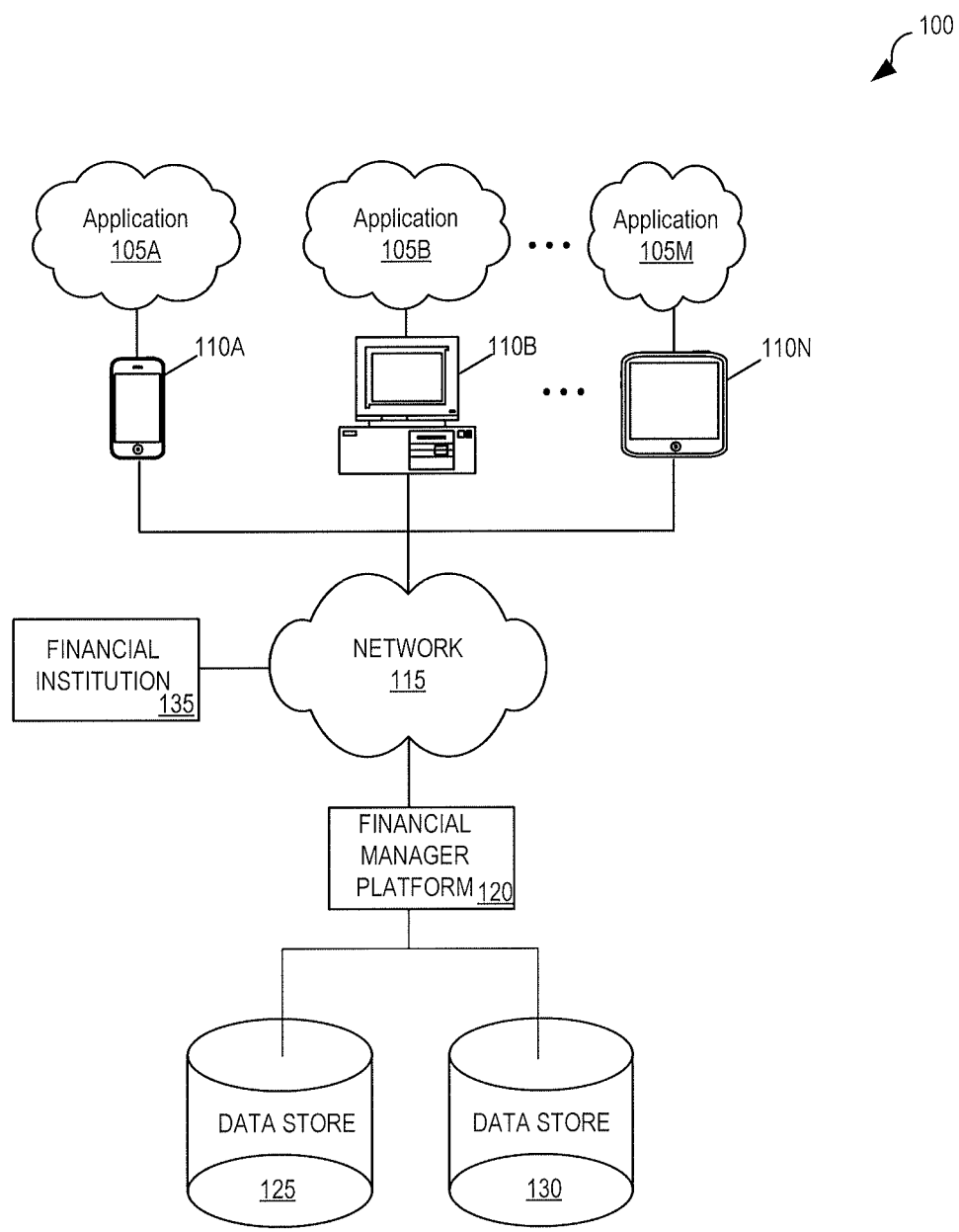
FIG. 1 illustrates an example of a network-based operating environment using the disclosed financial manager platform in accordance with various embodiments of the present disclosure.

Various embodiments of the present disclosure generally relate to components of a feature-rich computer language that is agnostic to platforms and devices for exchange, management, and manipulation of financial data.

Currently, there is a lack of a computer language that can be used to electronically represent financial data and manipulations on the data systematically, or rather programmatically. Existing systems also fail to customize messages for users. Also, a user who seeks financial advice typically is required to remember or record the details of the advice, which may result in the details of the advice being forgotten or lost by the user. Therefore, a user who wishes to maintain an electronic log of the financial advice or financial events concerning the advice has to maintain his or her own log of the information. These electronic logs are typically in some non-standardized, proprietary format that cannot be exchanged with other parties or other individuals for further manipulation, storage, and use. Furthermore, if a user has certain financial goals or plans (e.g., a set of actions) which he or she intends to change, a non-standard representation of financial information can pose challenges in determining the effects of changes in the financial goals of the user. Additionally, analysis of potential "what-if" scenarios can be problematic due to the difficulty in combining data in different formats in different systems and devices and by different users. Many users, particularly high net worth users, have multiple financial advisors operating on different systems.

Methods and systems disclosed herein establish a language that facilitates interoperability of personal financial data between languages computer systems can understand as well as languages people can understand. In some embodiments, financial information can be received from a first application on a first electronic device. After processing the financial information using the computer language, the disclosed system can transmit the financial information and/or additional financial information to a second application on a second electronic device. Translating the financial information enables the financial information to be easily exchanged across different electronic systems and thus helps users and financial advisors to better manage financial decisions.

The financial data and manipulations may be referred to as "messages." Messages may include advice or recommendations provided to the user (e.g., "We recommend that you deposit $200 of your next paycheck into your retirement account to meet your financial goals"), instructions provided by the user or an entity (e.g., "Deposit $200 of my next paycheck into my/customer's retirement account"), notifications to the user ("You are within $500 of overdrawing your checking account"), or if/then steps (e.g., "If my checking account rises above $50, transfer the extra to my savings account.")

Accordingly, methods and systems disclosed herein provide a computer language to exchange messages with information regarding financial actions or plans, financial events, and financial transactions in a standardized language that is agnostic to electronic platforms, systems, and technologies. Financial actions can include various actions such as "move money from checking into savings when the checking account exceeds $1000," or "pay off credit card with highest interest rate." Plans can include a set of actions such as establishing a budget and requesting assistance in maintaining a budget (e.g., telling the user when the user is off track and setting forth a plan to get back on track, making suggestions to meet the user's goals). For example, the language can communicate or exchange financial data with any number and type of computer servers operated by third parties. The third parties can belong to different industries, can be mobile applications, can be desktop applications operated by users, and/or can involve different types of computing devices. The language facilitates conversations between organizations. Also, the financial information can be exchanged using different web portals, websites, or, in general, any software or hardware computing platform. Furthermore, the financial data can be communicated with any number of users, including family members, friends and small businesses, their respective financial advisors, and their respective financial institutions. In some embodiments, financial data can be shared with trusted parties including social media platforms. In an example, funding goals can be provided to social media websites to ultimately be shared with family members to help fund a wedding, college account, or medical bills. Thus, according to embodiments disclosed herein, any financial transaction or event, including the parties involved, can be represented by data structures, keywords, and constructs, or, more generally, grammatical semantics of the disclosed computer language.

In some embodiments, messages such as events, financial actions and plans, and associated parties are represented using the computer language. Combined with technology such as voice recognition and natural language processing, the computer language allows users to speak a series of financial actions, which is codified into a format that can be exchanged digitally. For example, a discussion between a user and a financial advisor via a phone call can be captured and represented using the language and displayed in a user-friendly manner by a mobile application running on the user's phone and/or the financial advisor's phone. This would enable both the user and the financial advisor to review the next steps that they respectively have to take.

In some embodiments, one or more people or financial advisors are required to follow up with a financial event of a user. In some embodiments, not only are the specific details of the conversation between the user and the financial advisor captured in a message, but additionally, the disclosed system can analyze financial event(s) and or data associated with the conversation to provide other messages such as financial recommendations customized to the user. The recommendations can also include embedded online links and references to financial actions relating to the user's financial data. For example, the system can provide one or more financial investment categories that can apply to the user's financial event and data. The system can also provide one or more online links to informative articles and references that can be of potential interest to the user. In some embodiments, a user or a financial advisor might have specific questions about a financial event or the data associated with such events. Accordingly, the system can provide answers to the questions. In an example of how plans (a group of actions) are addressed, the system can advise users that the user is "off plan" and include encouragement to get the user "back on track."

In some embodiments, the system can maintain a log of financial transactions of one or more financial accounts of the user. For example, the disclosed system can maintain a log of past financial events or actions taken by a user. A user who is paying off his credit card debt can view the debt paid off so far, the dates and times any financial transactions were made, the debt remaining and other financial information. The system can use this financial information to provide custom messages to the user, for example, highlighting areas or categories of expenses (e.g., dining out, entertainment, or groceries) where the user can cut down expenses. As another example, the system can recommend financial instruments for investments to generate additional revenue. In some embodiments, the system can provide recommendations or steps for signing up for, or transferring existing debt to, other credit cards that might offer a lower interest rate. In some embodiments, the disclosed system facilitates real time or near real time exchange of financial information with other parties or electronic systems dynamically in response to an occurring financial event. In some embodiments, the financial information can be exchanged intermittently (e.g., ad hoc, when off plan) or periodically (e.g., daily, monthly, or weekly).

The disclosed computer language not only can represent financial information but also can represent various financial actions taken or performed by a user. Further, because the representation of the financial data is agnostic to the platforms and devices, the computer language is beneficial for exchange of financial data regardless of the type of data, device, or technology involved.

In some embodiments, one or more electronic tools such as an application program for servers, laptops, mobile devices, or any computing devices can be created using grammatical components or elements of the disclosed computer language. In some embodiments, users and financial advisors can enter financial information such as goals, financial actions, personal notes, and financial transactions into third-party application software using grammatical components of the disclosed computer language. Thus, embodiments of the present disclosure facilitate the manipulations of financial information using systems and components of a computer language as disclosed herein. In some embodiments, financial information can be integrated into varying third-party systems, platforms, and applications. For example, a financial advisor can dictate one or more grammatical components of the computer language into a voice dictation mobile app (e.g., offered by a third party) running on the financial advisor's mobile phone. The voice dictation software can transcribe the financial advisor's dictation, and further, along with dictation of additional financial information relevant to the dictated grammatical terms, the voice dictation software can generate a financial event with the grammatical components and the relevant financial information. The computer language can be implemented using various methods including by storing and/or transmitting the financial data as XML, JSON, YAML, or any other serializable language.

In some embodiments, the system and/or a user can send a message to set one or more financial goals, and the disclosed system can track the progress of a user in achieving those goals by using the standardized language. If a user changes a financial goal, the system can dynamically update the representation of the new financial goal and also update both the financial information and the associated recommendations, next steps, or instructions to reflect the new goal. For example, if a user who has set a goal of enrolling his son in a University A changes the goal of enrolling his son to a University B, the system registers the new financial goal using the standardized language. If the user's son is on pace to finish high school early and University B offers early admission, then the user's son could possibly enroll in University B with early admission. A change in timing of this goal may have an effect on the finances of the user. That is, the user might have to gather financial resources earlier than anticipated. Thus, when the user expresses a change in the financial goal, such as via a slider on an application (mobile or desktop) running on a computing device, the standardized language is used to register the change in the financial goal and provide recommendations, next steps, or instructions to the user regarding savings to get prepared for the change in the financial goal.

In some embodiments, the system informs a financial advisor of the change in the goal using the standardized language. In turn, the financial advisor and user can discuss how to address the change in the financial goal and their discussion can be logged using the standardized language. Thus, the disclosed system provides a computer language that represents the initial goal, associated financial information, change(s) to the financial goal, financial information of the new goal, and the next course of action(s) or recommendations needed to address the change.

In some embodiments, components of the disclosed computer language can be used to generate a visual timeline representing various financial events of a user over time. Thus, an event can be the birth of a baby in the next six months. A second event can be a user planning a vacation. Although these events occur in the life of a user, they are regarded as financial events as they have potential financial ramifications. The disclosed system and/or the disclosed language can visually generate a timeline including visual indicia corresponding to financial events on a graphical user interface (e.g., using a bubble, dot, mark, line, pin, horizontal bars, etc.). The visual indicia define a position of an event with respect to a timeline displayed on the graphical user interface.

When financial events are added to the timeline, new recommendations, steps, notifications, or instructions can be provided. Adding financial events to the timeline can automatically relocate the position of other financial events on the timeline with respect to time so that the financial events are displayed in the same GUI window. Additionally, when financial events are added to the timeline, existing event indications may be shifted upward or downward on the timeline to correspond with monetary changes that may occur with the addition of the financial event. For example, the timeline can show an indication of financial health on the vertical axis, and a line drawn over the timeline can show the user's past, current and predicted financial health. Thus, a user can view associated expenses on the timeline and view how the events are predicted to affect the user's finances (both currently and in the future) as the timeline is regenerated to account for the event. The event may result in a movement of the timeline down (or up) after the event is predicted to occur. The events may be translated using components of the disclosed computer language and/or the system to create the timeline on a GUI display screen.

In some embodiments, after an event is added, recommendations, next steps, or instructions by the system may result in events being shifted forward or backward in time to account for the change in a financial situation. For example, if the user indicates that a new vehicle will be needed in the next six months, a vacation event may be recommended to be moved past the six month mark to ensure that the user will have enough money to afford the vehicle. The various recommended scenarios can be displayed on the timeline with the events shifting positions to change the financial outlook.

In some embodiments, the system can provide budgeting options for a user. For example, a user on a budget can enter his or her daily expenditures via a mobile application running on a computing device. The system, based on the expenditures and the budget, can notify the user that he or she can spend a maximum of $25 which includes $10 for lunch. Thus, the disclosed computer language and system can allow for notifications to be pushed out to a user regardless of the platform or electronic device of the user.

Continuing with the example above, if a user has a priority of financial goals that he or she would like to meet, the disclosed system can provide projections as to when the user's goals can be met based on the budgeting options. For example, if a user's first priority is to pay off credit card debt, the system can inform the user when he or she would be able to do so if the user adheres to his daily, weekly, or monthly budget. If the user chooses to move to a different financial institution or get a second opinion, the financial advice and timelines can be used by the other financial institution due to the standardized computer language.

The grammatical computer language disclosed herein allows for seamless exchange of financial information and for automated financial transactions between customers and various financial institutions. In some embodiments, a user (e.g., financial representative on behalf of a customer, customer, or third party) can authorize a logic-based rules system such as "If-This-Then-That" to conditionally execute instructions using the computer language. For example, a user may set a rule such as "on the second day of each month, if, after paying my bills, my checking account has greater than $50, then transfer the extra to my savings account." In this example, a logic system can use the grammatical computer language described herein to receive the instructions and exchange information with a financial institution to execute the instructions.

In an example, a system can use the grammatical computer language to automatically receive information (e.g., from a third party system such as the user's bank) when events happen (e.g., Paycheck Deposited), to query for additional details (e.g., Account Balance), to send authorized commands to the financial institution (e.g., Transfer to Savings), and to receive/send event details (e.g., Transfer Complete and Report New Balances). The financial institution and/or third party can use a logic system employing the computer language to notify the customer in a human-friendly format (e.g., "Your transfer is complete and your new balance includes $50 in checking and $500 in savings.")

In a further example, a user can authorize a logic-based rules system provided by a third party (e.g., Brokerage Houses) to perform a market-based action using the computerized language. For example, the rule may state "When my brokerage account is greater than $5000 and Apple's (AAPL) stock price drops below $94, then issue a buy order for $5000 worth of Apple Stock through my brokerage account." In this example, the user's brokerage account provider provides a logic system that uses the grammatical computer language described herein to connect, in real-time, data about the user's brokerage account to market information, allowing the user to define and automate specific trades.

In some embodiments, the semantics of the disclosed computer language are easily understood and the data structures, constructs and keywords of the grammar closely track the English language. For example, constructs and keywords that carry an English meaning are included as grammatical components of this language. Words such as "save," "withdraw," "invest," "purchase," "schedule," "read," "follow-up," and other such words are included as grammatical components of this language. This facilitates easy-to-understand representation of financial information for ordinary users. Thus, not only are disparate electronic systems able to exchange financial information using this language, but also ordinary users can enter financial information using the disclosed computer language that is easy to read, write, and understand. Thus, users do not need to have knowledge of sophisticated computer programming techniques for entering financial information or registering financial events. In some embodiments, the entered financial information can be directly compiled without additional programming, for storage, manipulations, and exchanges by disparate electronic systems. Thus, the disclosed embodiments facilitate the representation, management, and exchange of financial information of a user involving any number of parties or electronic systems.

In some embodiments, systems that analyze, answer, or take action on financial information can use this semantic language to communicate the results of the analysis, actions, or answers back to the user in human-friendly grammar. Complex computer systems that perform analysis such as advanced pattern matching and algorithmic data analysis can use this language to communicate results of such analysis in a human-understandable form.

This disclosure describes a language that facilitates interoperability of personal financial data between languages computer systems can understand as well as languages people can understand. Various embodiments may provide one or more of the following technological improvements: 1) transportability of financial data between systems, organizations, and users, 2) interoperability between various platforms and organizations, and 3) a common standard for communicating financial information resulting in more complete information and better service for users.

As used herein, the term "user" is synonymous with any person or individual. Also, the system disclosed herein can be working in conjunction with or include grammatical (computer code) components of the disclosed computer language for representation, storage, manipulations, and exchanges of financial information. The terms "components of the computer language" and "elements of the computer language" are generally synonymous with any type of semantics, data structures, keywords, and constructs of the computer language. In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, ROMs, random-access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105M running on one or more computing devices 110A-110N (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105M may be stored on one or more computing devices 110A-110N or may be stored remotely on a server (in the "cloud"). These computing devices can include mechanisms for receiving and sending traffic by connecting through network 115 to financial manager platform 120 and data stores 125 and 130.

Computing devices 110A-110N may be configured to communicate via the network 115 with financial manager platform 120. In some embodiments, computing devices 110A-110N can retrieve information from or submit information to financial manager platform 120 and run one or more applications 105A-105M with customized content retrieved by financial manager platform 120 and data stores 125 and 130. For example, computing devices 110A-110N can execute a browser application or a customized client to enable interaction between the computing devices 110A-110N, financial manager platform 120, and data stores 125 and 130. In some embodiments, financial manager platform 120 can be a server.

Financial manager platform 120 provides grammatical components of a computer language for exchange of financial information. Financial information, for example, can be sent by one or more applications 105A-105M running on computing devices 110A-110N. This financial information is communicated using components of the disclosed computer programming language. Similarly, financial manager platform 120 can communicate financial information using components of the disclosed computer language to any application 105A-105M on any computing device 110A-110N. In some embodiments, financial manager platform 120 can communicate with financial institution 135 to exchange financial information. This communication can be based on the disclosed computer language. For example, financial institution 135 can inform financial manager platform 120 on a regular basis financial transactions made by the user. Such information can be utilized by the financial manager platform in analysis of a user's financial data to generate custom messages for the user.

The disclosed computer language allows financial manager platform 120 to create the steps necessary to complete financial tasks, collect necessary data, and pass that data along to financial manager platform 120 to complete the behind-the-scenes manipulations. As a result, this eliminates the need for users to remember their advised next steps. This also reduces the number of web pages or websites that a user has to visit to complete a financial task. For example, in a financial event relating to a user saving $1,000 in 6 months, conventional systems would require the user to visit at least three different webpages. A first webpage to set up the savings goal, a second webpage to create a savings account, and a third webpage to set up an automatic transfer from the user's financial account to the savings account. According to embodiments as disclosed herein, data can be collected (e.g., "save $1,000 in 6 months") from a user via an application running on a computing device and then this data can be passed to financial manager platform 120 to complete manipulation of the data and process the financial event automatically.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

In some embodiments, the disclosed computer language facilitates taking notes for users and financial advisors using an application program running on a computing device. These notes can be communicated to the financial manager platform 120 for manipulations and exchanges with other systems by the application program. Thus, instead of having a first application program that takes notes in a first format and a second application program to communicate the notes according to a second format, embodiments of the disclosed system combine the functionalities of several application programs into a single application program. Users and/or financial advisors can ask questions to each other and can also query the financial manager platform 120 via the application program.

In some embodiments, the disclosed system can be used as part of a call center at a financial institution such as an insurance company. For example, a member services representative (MSR) can type financial information into the system while speaking with a user on the phone. Using the proper grammatical components, the MSR will be able to enter the financial information of the user into the system that can be shared with other entities or manipulated by the system. The grammatical components of the disclosed language can be used to capture and represent such financial information of the user.

Figure 2:
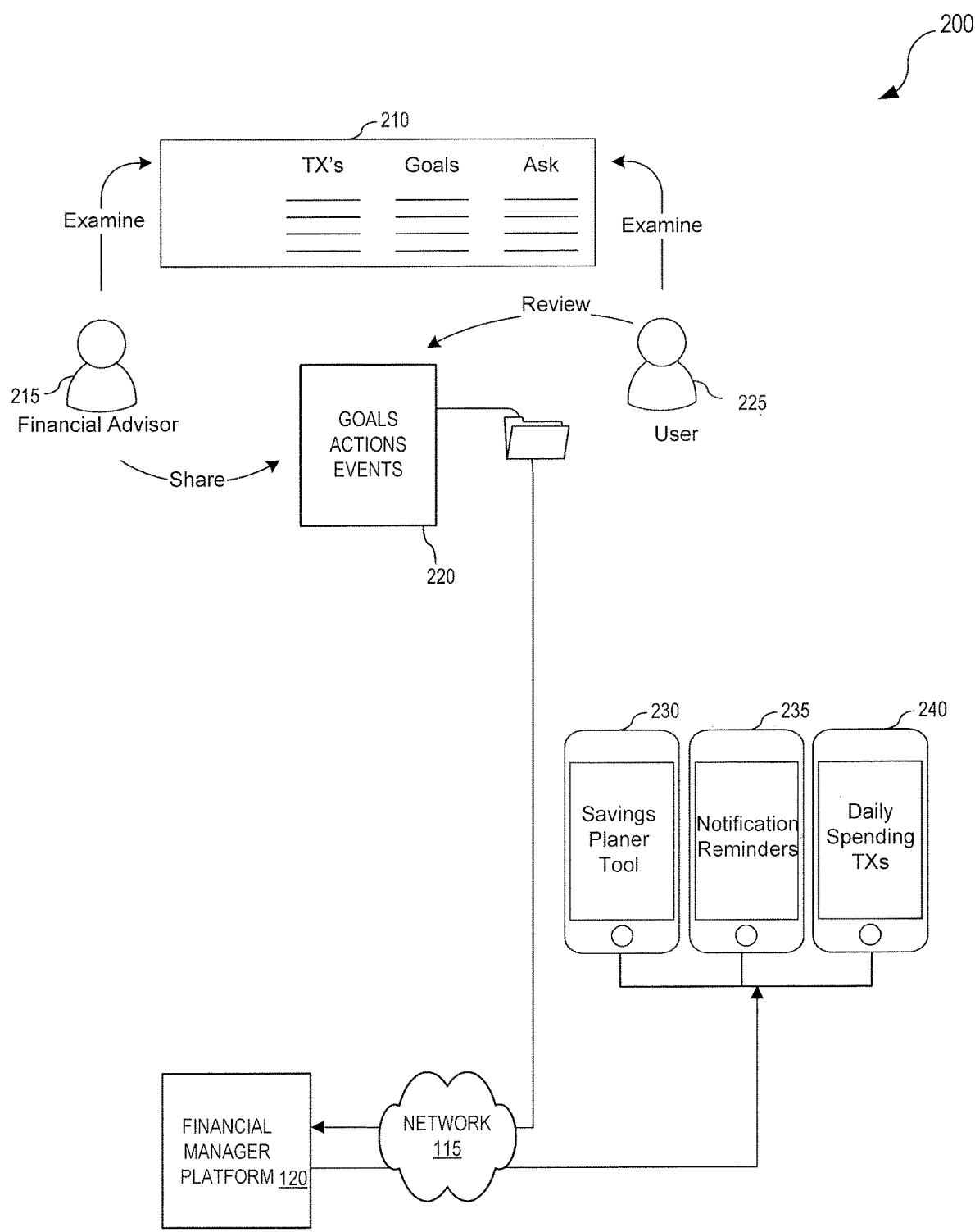
FIG. 2 illustrates an example of an embodiment facilitating use of a financial manager platform in accordance with various embodiments of the present disclosure.

FIG. 2 is a diagram illustrating 200 a use of the disclosed financial manager platform in accordance with various embodiments of the present disclosure. In this example scenario, an advisor 215 and a user 225 discuss financial details 210 of the user. This discussion can occur in-person or over an electronic medium like video chat or a telephone. Examples of financial details can be financial transactions made, financial goals to be achieved, and questions to be asked. Financial details 210 are represented by grammatical components of the disclosed computer language in an electronic format 220. For example, financial advisor 215 can use voice dictation software or a keyboard to enter financial details 210 in an electronic format 220 for sharing with user 225 for his or her review. Upon review by the user, financial details 210 in electronic format 220 can be stored in a database associated with the financial manager platform 120. After receiving financial details 210 in the electronic format 220, financial manager platform 120 analyzes financial data included therein. In some embodiments, financial manager platform 120 receives additional financial information from a user's financial institution (e.g., a bank, an insurance company, a credit card company, or a brokerage agency) informing relevant financial details of the user.

Financial manager platform 120 analyzes some or all of the user's financial data. In some embodiments, financial manager platform 120 accesses a database to retrieve past financial data (e.g., past transactions or information relating to bills due) of the user as may be suitable for the analysis. Financial manager platform can use advanced pattern matching or algorithmic data analysis (or receive such analysis from a different system such as IBM Watson).

Financial manager platform 120 then communicates or exchanges the results of the analysis (e.g., in the form of recommendations or next steps of action) to computing devices 230, 235, and 240. The information communicated to devices 230, 235, and 240 is represented electronically using components of the disclosed computer language. For example, financial manager platform 120 communicates to a savings planner tool (associated with financial manager platform 120 or associated with a third party) running as part of an application program on device 230. Financial manager platform 120 communicates notification reminders to device 235 and a list of daily spending transactions to device 240. Devices 230, 235, and 240 can be different electronic devices, can run different operating systems, and can be owned by different persons and/or entities. For example these can be owned and/or operated by any individual(s) or organization(s).

FIG. 3 illustrates a table 300 with various semantic grammar components of a standardized computer language for exchanging financial information that may be used in accordance with various embodiments of the present disclosure. For example, the grammatical components can be subjects, verbs, quantifiers, units, objects, measures, timeframes, intervals, qualifiers, and relationships. Each grammatical component can include additional grammatical components. For example, subjects can further include a person's name, a company, a group of people such as friends and family of a user, entities or third parties such as the Internal Revenue Service (IRS). Verbs can include actions such as understand, study, and read. Examples of quantifiers can be integers and decimals. Units can include dollars, percentages, steps, and occurrences. Objects can include types of financial accounts (such as savings, checking, or brokerage), investment vehicles, articles, reference materials such as online finance reports. Examples of measures can include a balance, an interest, and an amount due. Timeframes can include a hours, days, weeks, and years. Intervals can include hourly, daily, weekly, monthly, or any other interval. Qualifiers can include a conservative approach, a neutral approach, or an aggressive approach. Relationships can include a quantity per unit, contains, contained within, owns, and shared. Many other semantic grammar components can be included as part of the standardized computer language for financial transactions in accordance with various embodiments of the present disclosure.

For the purposes of illustration and discussion in FIGS. 4 and 5, terms of the disclosed computer language are referred as keywords, regardless of whether or not these terms have a preceding slash character ("/"). Thus, for example, both the terms <action> and </action> are referred to as keywords in the examples discussed herein.

FIG. 4 is an example of a financial event 400 as stored and represented using components of a standardized computer language for financial transactions in accordance with various embodiments of the present disclosure. For example, FIG. 4 includes keywords <action>, <for>, <from>, <title> and other keywords involved in representing a financial event associated with saving for an emergency fund in monthly increments. This financial event is represented using the disclosed language with the <save>, <title>, <amount>, <frequency> and other such keywords. These keywords are included in the semantic grammar components of a standardized computer language. In the example in FIG. 4, a user "Jill M. Saver" is saving $50 in monthly increments for a $1,000 emergency fund. The advisor for the user is a "Jane L. Advisor," and this communication (represented using the disclosed computer language) is from the advisor informing the user of the progress made so far by the user in saving for the emergency fund. The communication also discloses the percentage progress (e.g., 10%) and a quantity (e.g., $100) saved so far.

FIG. 4 also illustrates the details of the financial account of the user associated with the savings account. If the representative advises a customer to "save $1,000 towards an emergency fund in $50 monthly increments," the standardized digital language can parse the advice and take action. For example, the standardized computer language records that the advice is given by Jane L. Advisor (represented by </from>) to Jill M. Savor (represented by </for>), that the goal is to save $1,000 for Emergency Fund (represented by </title>), to a savings account (represented </account-type>), as well as other details. Thus, FIG. 4 demonstrates that ordinary users can speak, type, or enter financial information using typical language and the disclosed computer language can interpret it into a transportable language that a user can read, write, and understand with little or no training.

Users do not need to have knowledge of sophisticated computer programming techniques for entering financial information. In some embodiments, the entered financial information can be directly compiled without additional programming for storage, manipulations, and exchanges by disparate electronic systems. Thus, the disclosed embodiments facilitate the representation, management, and exchange of financial information of a user involving any number of parties or electronic systems.

FIG. 5 is an example of a financial event 500 as stored and represented using components of a standardized computer language for financial transactions in accordance with various embodiments of the present disclosure. For example, FIG. 5 indicates various actions taken by a user in connection with a financial event of saving for an emergency fund of $1,000 (e.g., as discussed in FIG. 4). FIG. 5 indicates that the disclosed system provides a history of actions (represented by the keyword </action>) taken by the user in connection with the financial event. FIG. 5 indicates that a user "Jill M. Saver" (represented with the keyword </performed-by>) saved (represented by the keyword </saved>) $100 so far in $50 increments made on Aug. 1, 2015 and Sep. 1, 2015, as represented by the keyword </date>.

Figure 6:
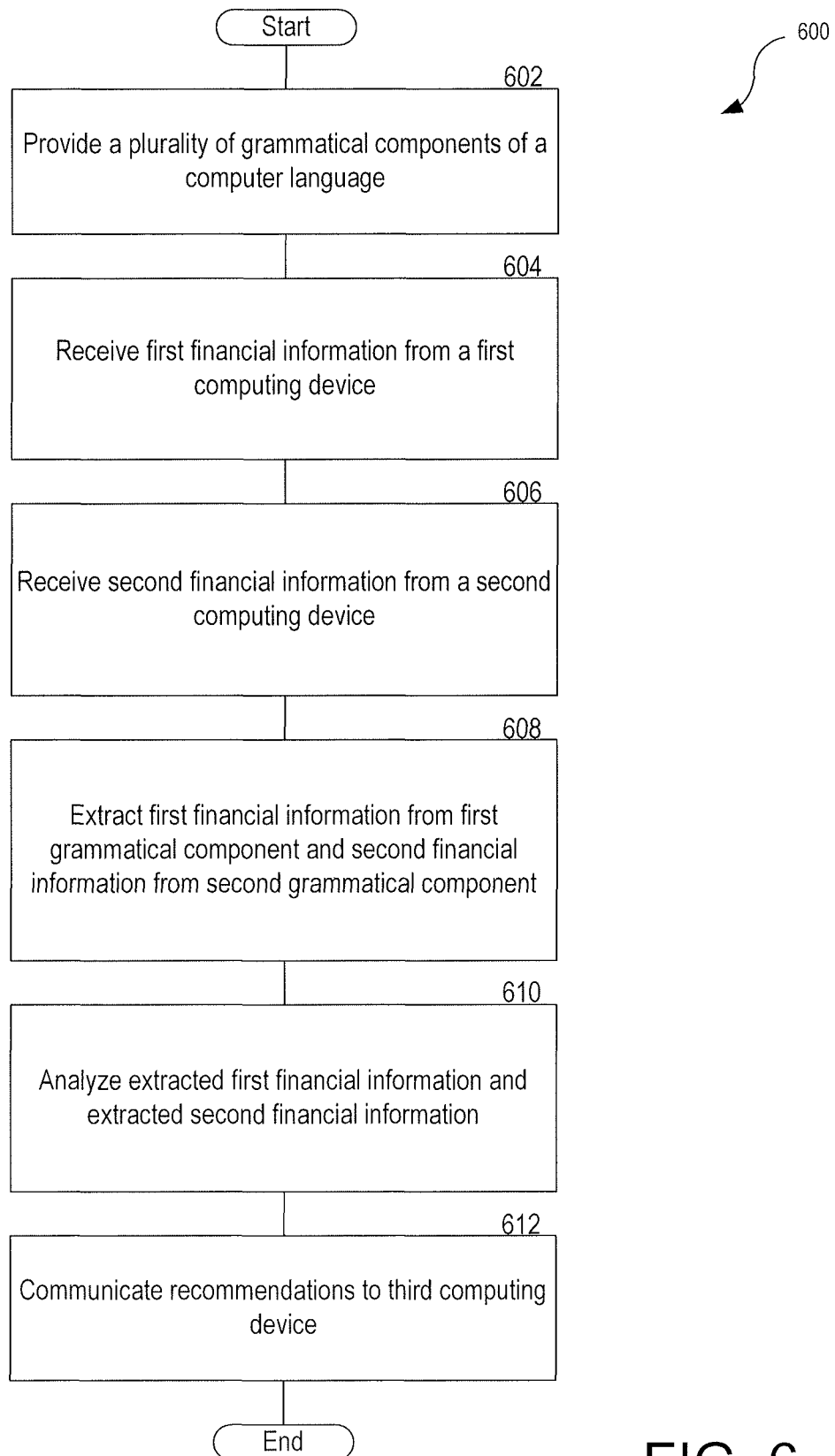
FIG. 6 is a flowchart illustrating a set of operations for management and manipulation of financial data in accordance with various embodiments of the disclosure.

FIG. 6 is a flowchart illustrating a set of operations 600 for exchange, management, and manipulation of financial data in accordance with various embodiments of the disclosure. In some embodiments, fewer than all of the operations in each set of operations are performed, whereas in other embodiments additional operations are performed. Moreover, in some embodiments, the operations may be performed in different orders or in parallel. The operations can be performed by various components of financial manager platform 120.

Provide operation 602 provides a plurality of grammatical components of a computer language that are available for representing financial events of a user. For example, the plurality of grammatical components can include at least one of: a subject, a verb, a quantifier, a unit, an object, a measure, a timeframe, an interval, a qualifier, or a relationship. Receive operation 604 receives (from a first computing device) first financial information defined using a first grammatical component of the computer language. For example, a user can provide financial information pertaining to saving $20,000 (i.e., first financial information) for an emergency fund in $500 bi-monthly increments using a "save" grammatical component of the language.

Receive operation 606 receives (from a second computing device) second financial information defined using a second grammatical component of the computer language. For example, a financial institution associated with the user can inform the disclosed system that the user has a $1,000 (i.e., second financial information) credit card bill due in two days using an "amount due" grammatical component of the language.

Extract operation 608 extracts the first financial information from the first grammatical component and the second financial information from the second grammatical component by parsing the first grammatical component and the second grammatical component. Analyze operation 610 analyzes the extracted first financial information and the extracted second financial information to generate recommendations customized for the user. For example, the system can recommend that the user pay off a minimum credit card amount prior to starting the savings account in order to avoid damaging the user's credit score. Recommendations can include a link to information. Communicate operation 612 communicates the recommendations (e.g., exchanges financial information) to a third computing device. For example, a third computing device can be a family member's mobile device or a financial advisor.

Figure 7:
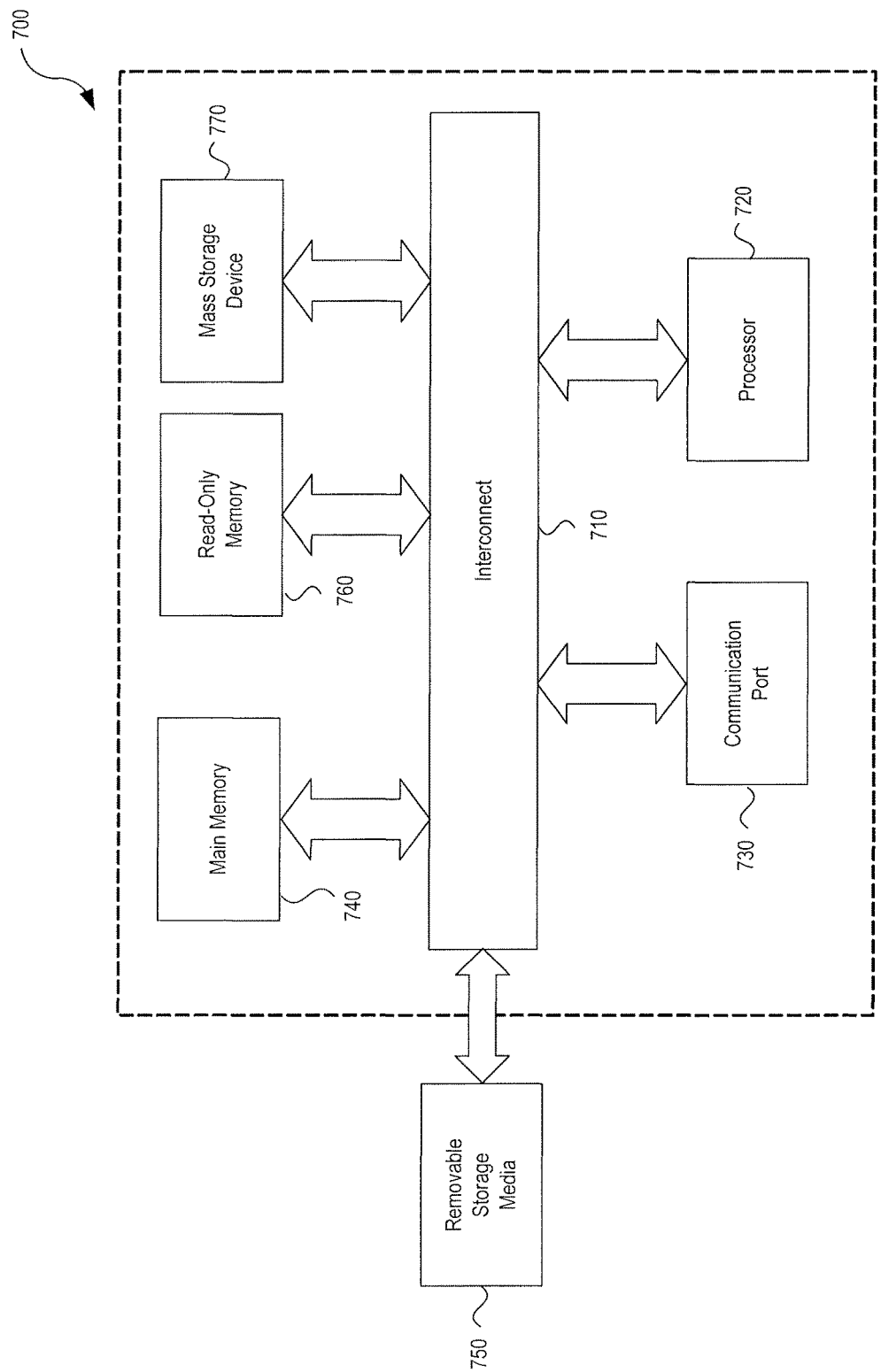
FIG. 7 illustrates an example of a computer system with which some embodiments of the present disclosure may be utilized.

FIG. 7 illustrates an example of a computer system with which some embodiments of the present disclosure may be utilized.

Computer System Overview

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes an interconnect 710, at least one processor 720, at least one communication port 730, a main memory 740, a removable storage media 750, a read-only memory 760, and a mass storage device 770.

Processor(s) 720 can be any known processor, such as, but not limited to, an Intel® Itanium® or Itanium 2® processor(s), or AMD® Opteron® or Athlon MP® processor(s), or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such a local area network (LAN), wide area network (WAN), or any network to which the computer system 700 connects.

Main memory 740 can be random-access memory (RAM) or any other dynamic storage device(s) commonly known in the art. Read-only memory 760 can be any static storage device(s) such as programmable read-only memory (PROM) chips for storing static information, such as instructions for processor 720.

Mass storage device 770 can be used to store information and instructions. For example, hard disks such as the Adaptec® family of SCSI drives, an optical disc, an array of disks such as RAID, the Adaptec family of RAID drives, or any other mass storage devices may be used.

Interconnect 710 communicatively couples processor(s) 720 with the other memory, storage, and communication blocks. Interconnect 710 can be a PCI/PCI-X- or SCSI-based system bus, depending on the storage devices used.

Removable storage media 750 can be any kind of external hard-drives, floppy drives, IOMEGA® Zip Drives, Compact Disc Read-Only Memory (CD-ROM), Compact Disc Re-Writable (CD-RW), Digital Video Disc-Read-Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a local area network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for creating and using a standardized computer language for financial transactions. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
   providing a plurality of grammatical components of a computer language for representing financial events of a user, wherein the plurality of grammatical components of the computer language includes at least one of: a subject, a verb, a quantifier, a unit, an object, a measure, a timeframe, an interval, a qualifier, or a relationship;
   receiving, by a computer server, first financial information pertaining to the user from a first computing device over a network, the first financial information defined using a first grammatical component in the plurality of grammatical components of the computer language;
   receiving, by the computer server, second financial information pertaining to the user from a second computing device over the network, the second financial information defined using a second grammatical component in the plurality of grammatical components of the computer language;
   extracting, by the computer server, the first financial information from the first grammatical component and the second financial information from the second grammatical component by parsing the first grammatical component and the second grammatical component;
   generating, by the computer server, an electronic format for the first and second financial information;
   analyzing, by the computer server, the electronic format to generate one or more messages customized for the user, the electronic format comprising at least one of the extracted first financial information and the extracted second financial information;
communicating the one or more messages to a third computing device;
causing a display of a timeline indicating a predicated financial health of the user on a display screen of the third computing device, the timeline including the first financial information represented with a first visual indicium and the second financial information represented with a second visual indicium, wherein the first and second visual indicium are displayed on the timeline with shifting positions to indicate changes in financial outlook pertaining to the user; and
adding a financial event to the timeline displayed on the third computing device, wherein the first and second visual indicium are moved on the timeline based on a monetary change to the predicted financial health of the user that occurs with the addition of the financial event.

2. The method of claim 1, wherein the one or more messages include one or more financial investment categories applicable to the user based on analyzing the extracted first financial information and the extracted second financial information.

3. The method of claim 1, further comprising:
generating a report using a third grammatical component in the plurality of grammatical components of the computer language, the report based on analyzing the first financial information and the second financial information.

4. The method of claim 1, further comprising:
communicating the first financial information or the second financial information to a fourth computing device.

5. The method of claim 1, wherein the first and second financial information is received via at least one of a web browser and a mobile application program.

6. The method of claim 1, further comprising:
in response to determining a change in the first financial information:
requesting, from the second computing device, a potential update of the second financial information; and
updating the one or more messages customized for the user based on the change in the first financial information and the potential update of the second financial information.

7. A system comprising:
the back end computer server with one or more memories storing instructions that, when executed by one or more processors, cause the back end computer server to perform a process comprising:
receiving, by the back end computer server, first financial information pertaining to the user from a first computing device over a network, the first financial information defined using a first grammatical component in a plurality of grammatical components of a computer language for representing financial events of a user, the plurality of grammatical components being executable on the back end computer server;
receiving, by the back end computer server, second financial information pertaining to the user from a second computing device over the network, the second financial information defined using a second grammatical component in the plurality of grammatical components of the computer language;
extracting, by the back end computer server, the first financial information from the first grammatical component and the second financial information from the second grammatical component by parsing the first grammatical component and the second grammatical component;
generating an electronic format for the first and second financial information;
wherein the electronic format is used to generate one or more messages customized for the user, and
wherein the electric format comprises at least one of the extracted first financial information and the extracted second financial information;
communicating the at least one message to a third computing device over the network;
causing a display of a timeline indicating a predicated financial health of the user on a display screen of the third computing device, the timeline including the first financial information represented with a first visual indicium and the second financial information represented with a second visual indicium, wherein the first and second visual indicium are displayed on the timeline with shifting positions to indicate changes in financial outlook; and
adding a financial event to the timeline displayed on the third computing device, wherein the first and second visual indicium are moved on the timeline based on a monetary change to the predicted financial health of the user that occurs with the addition of the financial event.

8. The system of claim 7, further comprising a database, wherein the back end computer server is further configured for:
storing the at least one message in the database.

9. The system of claim 7, wherein the plurality of grammatical components of the computer language includes at least one of: a subject, a verb, a quantifier, a unit, an object, a measure, a timeframe, an interval, a qualifier, or a relationship.

10. The system of claim 7, wherein the back end computer server is further configured for:
communicating the first financial information or the second financial information to a fourth computing device.

11. A non-transitory computer-readable medium comprising a set of instructions that, when executed by one or more processors, cause a machine to perform the operations of:
providing a plurality of grammatical components of a computer language for representing financial events of a user;
receiving, by a computer server, first financial information pertaining to the user from a first computing device over a network, the first financial information defined using a first grammatical component in the plurality of grammatical components of the computer language;
receiving, by the computer server, second financial information pertaining to the user from a second computing device over the network, the second financial information defined using a second grammatical component in the plurality of grammatical components of the computer language;
extracting, by the computer server, the first financial information from the first grammatical component and the second financial information from the second grammatical component by parsing the first grammatical component and the second grammatical component;
generating, by the computer server, an electronic format for the first and second financial information;
analyzing, by the computer server, the electronic format to generate one or more messages customized for the user, the electronic format comprising at least one of the extracted first financial information and the extracted second financial information;

communicating the one or more messages to a third computing device over the network;

causing a display of a timeline indicating a predicated financial health of the user on a display screen of the third computing device, the timeline including the first financial information represented with a first visual indicia and the second financial information represented with a second visual indicia, wherein the first and second visual indicium are displayed on the timeline with shifting positions to indicate changes in financial outlook; and adding a financial event to the timeline displayed on the third computing device, wherein the first and second visual indicium are moved on the timeline based on a monetary change to the predicted financial health of the user that occurs with the addition of the financial event.

12. The non-transitory computer-readable medium of claim 11, wherein the plurality of grammatical components of the computer language includes at least one of: a subject, a verb, a quantifier, a unit, an object, a measure, a timeframe, an interval, a qualifier, or a relationship.

13. The non-transitory computer-readable medium of claim 11, wherein the set of instructions, when executed by the one or more processors, further cause the machine to:

communicate the first financial information or the second financial information to a fourth computing device.

14. The non-transitory computer-readable medium of claim 11, wherein the set of instructions, when executed by the one or more processors, further cause the machine to:

in response to determining a change in the first financial information:

request, from the second computing device, a potential update of the second financial information; and update the one or more messages customized for the user based on the change in the first financial information and the potential update of the second financial information.

15. The non-transitory computer-readable medium of claim 11, wherein the set of instructions, when executed by the one or more processors, further cause the machine to:

insert links to online references in the one or more messages customized for the user.

16. The method of claim 1, wherein the timeline includes a vertical axis to indicate a first parameter and a horizontal axis to indicate time.

17. The method of claim 1, further comprising:

establishing an action that will be initiated by the second computing device when a predetermined condition is met by the first financial information from the first computing device; and sending a message to direct the second computing device to take the action when the predetermined condition is met.

18. The method of claim 1, further comprising:

adding the financial event to the timeline displayed on the third computing device, the financial event represented with a third visual indicium, wherein the first, second and third visual indicium are displayed on the display screen simultaneously;

computing a change to the first and second financial information based on the financial event; and adjusting at least one of the first and second visual indicium on the timeline based on the change.

19. The system of claim 7, wherein the back end computer server is further configured for:

establishing an action that will be initiated by the second computing device when a predetermined condition is met by the first financial information from the first computing device; and sending a message to direct the second computing device to take the action when the predetermined condition is met.

20. The system of claim 7, wherein when a financial event represented with a third visual indicium is added to the timeline displayed on the third computing device, the back end computer server is further configured for:

computing a change to the first and second financial information based on the financial event; and adjusting at least one of the first and second visual indicium on the timeline based on the change.

* * * * *